Aug. 1, 1961      E. A. VOLK, JR      2,994,194
STARTING SYSTEM HAVING A GAS GENERATOR
Filed Dec. 5, 1958
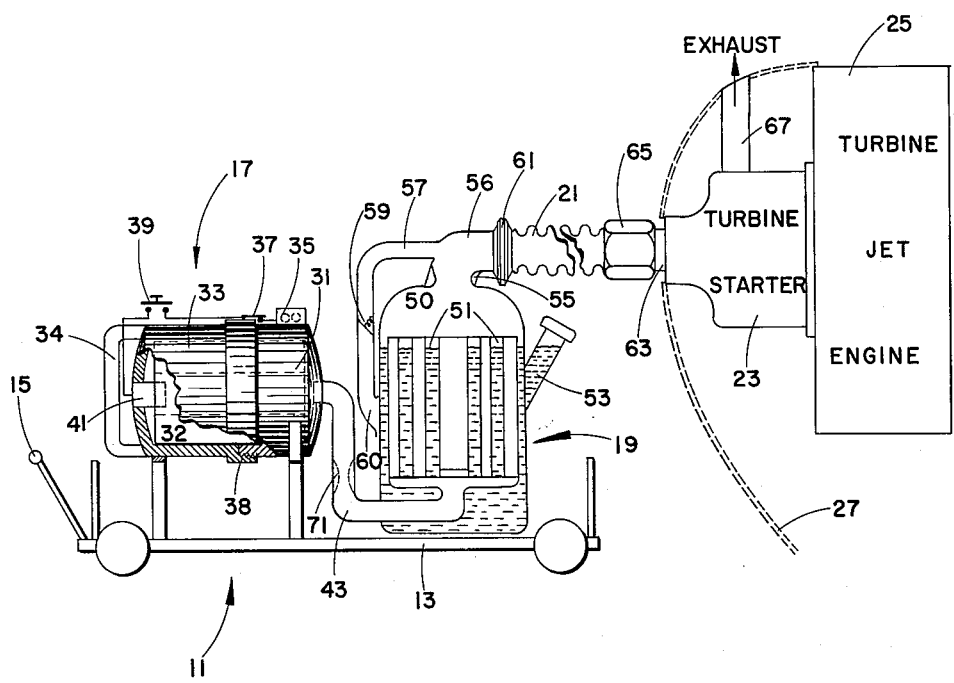
INVENTOR.
EMIL A. VOLK JR.
BY Robert W. Ely

United States Patent Office 2,994,194
Patented Aug. 1, 1961

2,994,194
STARTING SYSTEM HAVING A GAS GENERATOR
Emil A. Volk, Jr., Hasbrouck Heights, N.J., assignor to The Bendix Corporation, a corporation of Delaware
Filed Dec. 5, 1958, Ser. No. 778,471
2 Claims. (Cl. 60—39.14)

This invention relates to a starting method or system for jet-type aircraft engines and more particularly concerns such a method or system which has a turbine starter and combustion means for generating turbine-driving gases.

It is customary to provide gases for air turbine starters for starting of turbo jet engines by having a pressurized air supply from a permanent installation at the air base or by having ground compressor carts which provide pressurized air. However, there are instances when a particular airfield does not have such an installation or such other compressor sources are inoperative. Thus, there is a need for a lightweight, reasonably-small unit which can be in reserve at an airfield or can be carried in the aircraft for emergency use or flown in another plane for starting the engine of an airplane which has made a landing where an air supply for starting is not available.

An object of the present invention is to provide a novel improved starting method or system which generates and conditions hot combustion gases.

Another object is the provision of a small lightweight gas generator which uses a solid propellant cartridge, a liquid-cooling mass-adding device and a pressure regulator whereby a turbine starter for starting of a jet engine can be powered.

A further object is the provision of a small compact portable ground cart which is self-contained as to gas sources, coolant, electrical power and controls and is reliable and simple to maintain and operate.

An additional object is the provision of gas generator in which a coolant such as water is properly added to gases from a solid propellant cartridge by an arrangement which does not require external energy.

Another object is the provision of a gas generator in which the hot combustion gases vaporize by indirect heat exchange a liquid to cool the gases and to add mass to the gases for obtaining a better turbine-powering gaseous fluid.

The achievement of the above objects by the present invention along with features and advantages thereof will be apparent from the following description and the accompanying drawing.

The drawing schematically shows a jet engine starting system comprised of a gas generator which has a cartridge breech, a water tank which has gas tubes and aircraft which has a turbine starter and a jet engine with the gas generator arranged to provide a gaseous flow (augmented with gaseous mass from a liquid) to power the starter for starting the jet engine.

The gas generator 11 includes a wheeled supporting cart 13 having a handle 15, a cartridge breech 17 and a vaporizing-additive liquid tank unit 19 for cooling and adding a gaseous medium to the cartridge gases, and a flexible conduit 21 for delivering the mass-augmented and cooled cartridge gases to the turbine starter 23 which is associated with the turbo jet engine 25 within the aircraft 27.

The cartridge breech is comprised of two parts, a receiver 31 for the right end of the solid propellant cartridge 32, a closure 33 having a handle 34. A battery 35 is mounted on and grounded to the receiver 31. An arming interlock switch 37 is closed when the overlap 38 of the closure is threaded on the receiver 31 whereby a connection is provided from the battery 35 which is the sole source of energy required to the normally open firing switch 39. When firing switch 39 is closed, the circuit to the cartridge igniter or squib 41 is completed. A gas discharge outlet 43 connects to the center of the right end of the breech 17 so that gases from the center of the annular ammonium nitrate cartridge 32 can move toward the vaporizer 19. The vaporizer or mass adder 19 is comprised of a liquid tank 50 for water or non-freezing water-alcohol or chloroform and a bundle of open top, vertically extending tubes 51 suitably manifolded at the bottom thereof to conduit 43. A capped filling tube 53 provides for filling and prevents escape of pressurized fluid. It is apparent that hot cartridge gases will vaporize any fluid adjacent tubes 51 and the gases will be cooled. These vapors will add mass to the gases, giving an appreciably mass-augmented gas flow. The top of the tank 50 has a restricted passage or throat 55 in outlet pipe 56 for maintaining pressure in breech 17. Downstream of throat 55, in outlet pipe 56, pressure regulation is provided by means of vent passage 57 having a normally-closed spring-biased, flapper-type, pressure-regulating valve 59. The outlet 60 of the vent pipe 57 is curved toward the vaporizer 19 so that residual heat is utilized and the vent flow is safely discharged in respect to personnel. Pipe 56 is joined to flexible conduit 21 by means of joint 61 and conduit 21 is connected to an inlet pipe 63 in the aircraft 27 by means of coupling 65. The turbine starter 23 exhausts through pipe 67. Starter 23 is conventional and contains a turbine, turbine nozzles and scroll, an exhaust chamber, speed reduction gearing, and means for permitting the jet engine to overrun the starter after start-up (none of which is shown). It is to be noted that the generator is entirely self-contained as to hot gas source, liquid source and electricity from the battery.

In operation, the breech 17 is loaded with a cartridge 32 and closure 33 is attached to close arming switch 37. Next, the flexible conduit is connected to the turbine starter inlet 63 by coupling 65.

Starting switch 39 will be closed and the cartridge 32 ignited by squib 41. The hot high-pressure gases will pass through conduit 43 and through tubes 51. Gases in the tubes will heat and vaporize the liquid surrounding the tubes, reducing the pressure somewhat of the gases and cooling the gases to a suitable temperature, such as the temperature required (300° F.) for a low-temperature starter turbine. In addition to cooling to the range of 300–450° F., the vapors from the liquid will beneficially mass-augment the cartridge gases to provide gas-steam flow of higher density. The pressure in the breech 17 will be maintained by the throat 71. The cooled higher-mass flow will be pressure-regulated by to a predetermined pressure, such as forty-five p.s.i.a. for an air turbine starter, by flapper valve 59. The cooled, mass-augmented, pressure-regulated gas flow will then move to the turbine starter 23 and the jet engine will be started in the conventional manner. Excess gas will be vented through exhaust pipe 67 after start-up when the starter is disengaged from the engine.

For powering a typical air turbine starter for the J–75 and J–79 engines, an ammonium nitrate cartridge of about eight pounds and about six pounds of water or alcohol-water (forty–fifty percent methyl alcohol by weight) will provide the required energy at low temperature.

It is apparent that persons skilled in the art can make changes in the disclosed embodiment without departing from the invention as set forth in the appended claims.

What is claimed is:
1. A portable gas generator for a turbine starter of an aircraft comprised of a wheeled cart, a solid propellant cartridge breech and a self-contained electric con- trol therefor mounted on said cart, said electric control including firing switch, a liquid tank mounted on said cart, said tank having a capped filling tube and a tank outlet pipe extending from the top thereof, a bundle of open-top vertically-extending tubes in said tank, conduit means connected to said breech and manifolded to the bottoms of said tubes for passing cartridge gases to tubes whereby a liquid around said tubes is heated, vaporized and added to the cartridge gases in the top of said tank, said tank outlet pipe having vent means solely responsive to pressure in said tank outlet pipe and arranged to regulate the pressure of the gases in said outlet pipe to a predetermined pressure, a flexible conduit connected to said tank outlet pipe for connecting the gas generator to said turbine starter to provide suitable gases therefor.

2. A portable gas generator for a turbine starter of an aircraft comprised of a wheeled cart, a solid propellant cartridge breech and a self-contained electric control therefor mounted on said cart, said electric control including a battery connected through a firing switch to a cartridge igniter, a liquid tank mounted on said cart, said tank having a capped filling tube and a tank outlet pipe extending from the top thereof, a bundle of open-top vertically-extending tubes in said tank, conduit means connected to said breech and manifolded to the bottoms of said tubes for passing cartridge gases to said tubes whereby a liquid around said tubes is heated, vaporized and added to the cartridge gases in the top of said tank, said tank outlet pipe having restricted throat, an atmospheric vent pipe connected into said tank outlet pipe downstream of said throat, said vent pipe having a normally-closed, spring-biased valve, said valve being operable solely in response to pressure and arranged to vent said outlet pipe to regulate outlet gases to a predetermined pressure, a flexible conduit connected to said tank outlet pipe for connecting the gas generator to said turbine starter to provide suitable gases therefor.

References Cited in the file of this patent

UNITED STATES PATENTS

| | | |
|---|---|---|
| 1,019,164 | Krohn et al. | Mar. 5, 1912 |
| 1,233,618 | Taylor | July 17, 1917 |
| 2,740,356 | Millns | Apr. 3, 1956 |
| 2,842,937 | Clark | July 15, 1958 |
| 2,922,050 | Loughran | Jan. 19, 1960 |

FOREIGN PATENTS

| | | |
|---|---|---|
| 1,116,831 | France | Feb. 13, 1956 |

(Corresponding to Great Britain No. 793,978, Apr. 23, 1958)

| | | |
|---|---|---|
| 666,519 | Great Britain | Feb. 13, 1952 |
| 670,309 | Great Britain | Apr. 16, 1952 |